March 7, 1933.  J. H. PRICE  1,900,521
PISTON HEAD GUARD
Filed Feb. 6, 1931
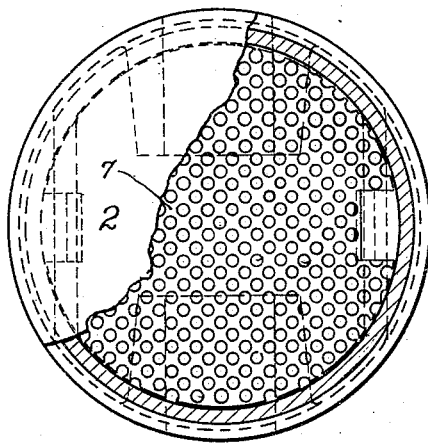
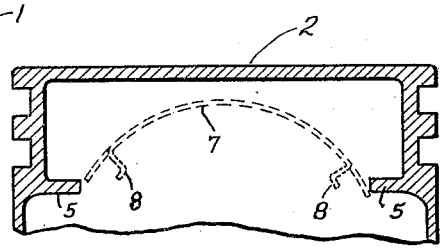
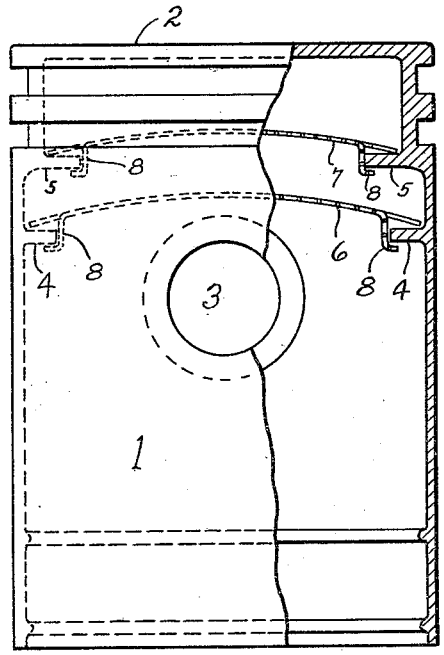
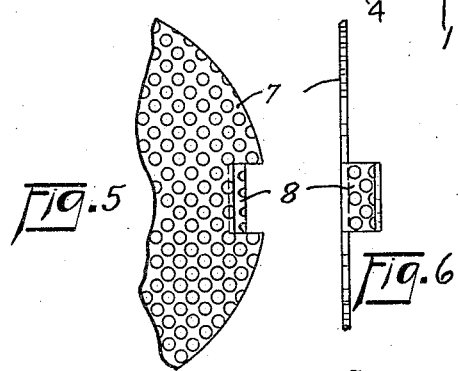
Inventor
James H. Price
By Rice and Rice
Attorneys
Witness:
Geo. L. Chapel Patented Mar. 7, 1933

1,900,521

UNITED STATES PATENT OFFICE

JAMES H. PRICE, OF GRAND RAPIDS, MICHIGAN

PISTON HEAD GUARD

Application filed February 6, 1931. Serial No. 513,867.

The present invention relates to pistons and more particularly to perforated discs adapted to fit within hollow engine pistons of internal combustion engines.

The main objects of the invention are to provide a disc adapted for insertion within a hollow engine piston to prevent formation of carbon on the under side of the piston head; to provide a perforated disc adapted for insertion within a hollow engine piston in spaced relation to the piston head; to provide a disc of the character above described which is made of metal having relatively slight caloric expansion but considerable resiliency; to provide such a disc which will prevent the splash of the lubricating oil against the under side of a piston head; and, to provide such a disc which may be readily inserted and easily withdrawn yet tensionally retained.

An illustrative embodiment of the invention is shown in the accompanying drawing wherein:

Figure 1 is a top plan view of an internal combustion engine piston, the head thereof being broken away to show the perforated disc therebelow;

Figure 2 is a side elevational view of a conventional type of an internal combustion engine piston, a portion thereof being broken away to show the manner in which a pair of discs are tensionally retained in spaced relation to each other and in spaced relation to the piston head;

Figure 3 is a fragmentary longitudinal sectional view of a conventional type of piston, showing in dotted lines the manner in which the disc is inserted;

Figure 4 is an enlarged fragmentary view of the disc and piston wall, showing the manner in which it is tensionally secured within the hollow piston;

Figure 5 is a fragmentary top plan view of the disc per se; and

Figure 6 is a fragmentary side elevational view thereof.

It is a generally known fact that lubricating oil within the crank case of internal combustion engines is wasted and destroyed in a large measure because of excessive heat caused by the periodic explosion of gasoline above the piston head. Lubricating oil splashed against the under side of the piston head, which in operation attains a heat no oil will stand, is carbonized. The carbon in time peals or scales off and falls back into the crank case with the result that pistons, piston rings, cylinder walls and crank shaft and connecting rod bearings are subjected to undue wear. The present device is designed to prevent this difficulty. I am aware that the prior patented art discloses devices of this general character but none of them disclose a perforated disc which is obviously subject to less heat expansion and which is obviously more flexible.

Referring to the drawing in which like parts are designated by the same numerals in the several views, a conventional type of internal combustion engine piston 1, having a head 2, and wrist pin bearings 3, is provided with a pair of spaced oppositely disposed laterally projecting shelves 4, 5 disposed between the piston head and the wrist pin bearings.

A pair of perforated discs 6, 7, preferably of brass or some other relatively non-expanding metal, are each provided with a pair of oppositely disposed peripheral depending hooks 8. The upper disc 7 is preferably provided with smaller perforations than those in the lower disc and both discs are sufficiently resilient to be sprung into place as indicated in Figure 3. When the discs are thus inserted, they rest on the upper sides of the shelves 4 and 5 respectively in bowed position and the series of peripheral depending hooks engage the under side of said shelves for tensional retention thereby.

The oil in the crank case which is splashed upwardly into the hollow piston during the reciprocating movement thereof strikes against the under surface of the lower disc and that portion thereof which passes through its perforations is splashed against the under side of the upper disc which is provided with smaller perforations.

It will thus be seen that the lubricating oil within the crank case is effectively prevented from coming in contact with the under side of the piston head and that carbonization thereof is thus prevented.

While but one specific embodiment of this invention has been herein shown and described, it will be understood that numerous details of the construction shown may be altered or omitted without departing from the spirit of this invention as defined by the following claims.

I claim:

1. In a perforated splash disc having a pair of oppositely disposed peripheral depending hooks, said disc being adapted to be supported on the upper sides of a pair of oppositely disposed laterally projecting shelves of a hollow piston and said hooks being adapted to engage the under sides of said shelves, said disc when inserted being upwardly bowed for tensional retention by said shelves.

2. In a perforated splash disc having a pair of oppositely disposed peripheral depending hooks, said disc being adapted to be supported on the upper sides of a pair of oppositely disposed laterally projecting shelves of a hollow piston and said hooks being adapted to engage the under sides of said shelves.

3. In a hollow piston having a pair of oppositely disposed laterally projecting shelves in spaced relation below the piston head, a perforated flexible disc having a pair of oppositely disposed peripheral depending hooks, said disc being supported on the upper sides of said shelves and said hooks engaging the under sides of said shelves.

4. In a hollow piston, a pair of spaced perforated discs within said piston and in spaced relation to the piston head, said upper disc having smaller perforations than said lower disc.

In testimony whereof I have hereunto set my hand at Grand Rapids, Michigan, this 3rd day of February, 1931.

JAMES H. PRICE.